United States Patent [19]

Moore et al.

[11] Patent Number: 4,797,528

[45] Date of Patent: Jan. 10, 1989

[54] VACUUM CARBON ARC METAL REMOVAL PROCESS AND APPARATUS

[75] Inventors: Paul E. Moore, Glouster; Jeffrey S. Henderson, Lancaster; Lawrence R. Soisson, Hide-A-Way Hills; Andrew J. Toth, Copley, all of Ohio

[73] Assignee: Arcair Company, Lancaster, Ohio

[21] Appl. No.: 130,016

[22] Filed: Dec. 8, 1987

[51] Int. Cl.⁴ .......................... B23K 9/32; A47L 5/00
[52] U.S. Cl. ........................................ 219/70; 15/345; 219/137.41; 266/49
[58] Field of Search ................. 219/70, 69 R, 137.41, 219/121.49, 121.5; 15/326, 330, 339, 345, 353, 354, 340; 266/49; 148/9.5

[56] References Cited

U.S. PATENT DOCUMENTS

| | | | |
|---|---|---|---|
| D. 271,290 | 11/1983 | Coughlin | D12/36 |
| D. 281,250 | 11/1985 | Johnson | D15/144 |
| 1,981,570 | 11/1934 | Price | 15/339 |
| 3,186,132 | 6/1965 | Duncan et al. | 15/345 |
| 3,524,038 | 8/1970 | O'Kelly, Jr. | 219/70 |
| 4,062,085 | 12/1977 | Duncan | 15/339 |
| 4,168,562 | 9/1979 | Maasberg | 15/340 |
| 4,183,116 | 1/1980 | Thompson | 15/340 |
| 4,287,405 | 9/1981 | Ohmae et al. | 219/137.41 |
| 4,330,109 | 5/1982 | Coughlin | 266/67 |
| 4,388,514 | 6/1983 | Coughlin | 219/69 R |
| 4,493,970 | 1/1985 | Rieppel | 219/137.41 |
| 4,502,179 | 3/1985 | Coughlin | 15/322 |
| 4,527,037 | 7/1985 | Johnson et al. | 219/70 |
| 4,565,914 | 1/1986 | Suzaki et al. | 219/70 |

FOREIGN PATENT DOCUMENTS

| | | | |
|---|---|---|---|
| 2948475 | 6/1981 | Fed. Rep. of Germany | 15/345 |
| 3421202 | 1/1986 | Fed. Rep. of Germany | 219/137.41 |

Primary Examiner—A. D. Pellinen
Assistant Examiner—Geoffrey S. Evans
Attorney, Agent, or Firm—James C. Simmons

[57] ABSTRACT

A process and apparatus for cutting and gouging a workpiece wherein solely a vacuum is used as the operative molten metal removal force. Isolating the atmosphre surrounding the arc as it melts the workpiece while evacuating the atmosphere as the melting proceeds thus facilitating a better cut or gouge with lower process generated noise and removal of process generated fume.

8 Claims, 2 Drawing Sheets

VACUUM CARBON ARC METAL REMOVAL PROCESS AND APPARATUS

TECHNICAL FIELD

This invention pertains to cutting or gouging of metal (metal removal) using an electrode to melt the metal and the force of a moving fluid to forcibly remove the molten metal from the influence of an arc created between the electrode and the work piece. The present invention has certain similarities to the conventional Air Carbon-Arc Cutting and Gouging Process wherein an electrode is used to strike and maintain an arc between a workpiece causing melting of metal underneath the arc. As melting progress a steam of high pressure air directed along the electrode toward the arc causes the molten metal to be forcibly removed from the influence of the arc, thus leaving a groove or gouge, in the surface of the workpiece. The conventional process can also be used to cut completely through the workpiece in the area traversed by the electrode and the arc.

BACKGROUND OF THE PRIOR ART

Present methods and apparatus used to practice the conventional Air Carbon Arc Cutting and Gouging Process involved the melting of a metal workpiece by an electric arc and blowing away of the molten metal with a high velocity jet of air applied under pressure from a source such as a compressed air supply. Although this is a fast and efficient process, it presents environmental problems associated with spraying of the molten metal into the surrounding areas and generation of fumes consisting primarily of metal oxides of the metal being worked on. Extremely high noise levels are produced, usually in the range of 115-125 DbA which are above the accepted industry standards for operator exposure without the use of noise protection equipment.

A U.S. Pat. No. 4,527,037 discloses and claims an automatic Air Carbon-Arc Cutting and Gouging Torch that is a standard in the industry. The device of the '037 patent is usable in the present invention and the specification of the '037 patent is incorporated herein by reference for the disclosure of the device as well as for a discussion of the Air Carbon-Arc Cutting and Gouging Process in general.

In the past in order to control the problems associated with the Air Carbon-Arc Metal Removal Process the metal spray inherent in the process has usually been controlled by erecting barricades or enclosures around the work area where the cutting or gouging work is being performed. The same effect can be obtained by merely isolating the work area from other workers. The fume generation problem associated with the Air Carbon-Arc Cutting and Gouging Process is usually handled by suitable ventilation of the work area where the fumes are collected with a suction device incorporating filtration systems. These latter devices are usually large and correspondingly expensive in order to cope with degree of particulate levels produced. Collection devices used with the torch have been tested at various times in the past in an attempt to collect the molten metal spray produced by the process, but have usually failed after short time due to damage caused by hot metal striking the internal components of such systems. These devices, when not destroyed, soon become clogged with solidified metal and soon cause unacceptable system operational delays.

One attempt to solve this problem is detailed in U.S. Pat. Nos. 4,338,514 and 4,502,179 both of which are owned by the assignee of the present invention. The device of the '514 and '179 patents utilized a cumbersome hood and evacuation system in order to minimize the metal spray and fume generation problems. The use of insulation in the cumbersome hood of these devices also helped to reduce the magnitude of the process generated noise. The specifications of the '514 and '179 patents are also incorporated herein by reference.

Thus no significant solution to the noise generation problem has been incorporated into conventional Air Carbon-Arc Cutting and Gouging process equipment. Therefore, personal protection devices such as ear plugs are generally used by operators to minimize the effect of the high noise levels generated when using the air carbon-arc process. Furthermore, large enclosure are utilized as noise barriers to eliminate the noise transferred to the surrounding areas.

SUMMARY OF THE INVENTION

In order to provide an effective solution to the problems of metal spray, fume generation and excessive noise with the Air Carbon-Arc Cutting and Gouging Process a metal removal process was discovered wherein the conventional carbon graphite electrode can be used to establish the arc between itself and the workpiece to melt the portion of the workpiece under the influence of the arc. The new process employees the use of a vacuum to remove the process generated molten metal and fume from the area of the arc. The new process is achieved by creating a small chamber or volume of defined physical size to isolate a portion of the electrode and the related arc struck between the electrode and the workpiece. The isolated area is then subjected to the effect of a vacuum which pulls ambient air through an evacuation device to form a jet of air which is focused and closely surrounds the molten metal. The force of the vacuum removes the molten metal from the influence of the arc and transports it to a container for collection and thus prevents the molten metal and associated process generated fume from being dispersed into the ambient environment. Water injected into chamber or volume of defined dimensions serves to quench the molten metal in the evacuation device so that it can be handled and disposed of safely. The process and apparatus of the present invention reduce the overall operating noise common to the conventional air carbon-arc cutting and gouging process.

The inventive process, which can be embodied in a complete portable metal removal system, has been designated as the vacuum carbon metal removal process.

The process of the present invention can be utilized with an automatic air carbon-arc cutting and gouging torch such as shown in U.S. Pat. No. 4,527,037 which is used in association with a vacuum nozzle, a collection tube, a vacuum or suction generating device and a collection container.

DETAILED DESCRIPTION OF THE INVENTION

Figure 1:
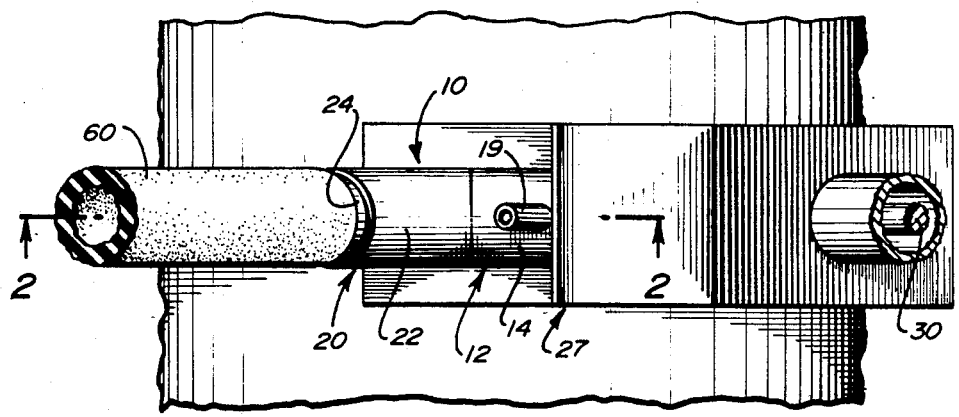
FIG. 1 is a plan view of a vacuum carbon arc metal removal nozzle of the present invention.
Figure 2:
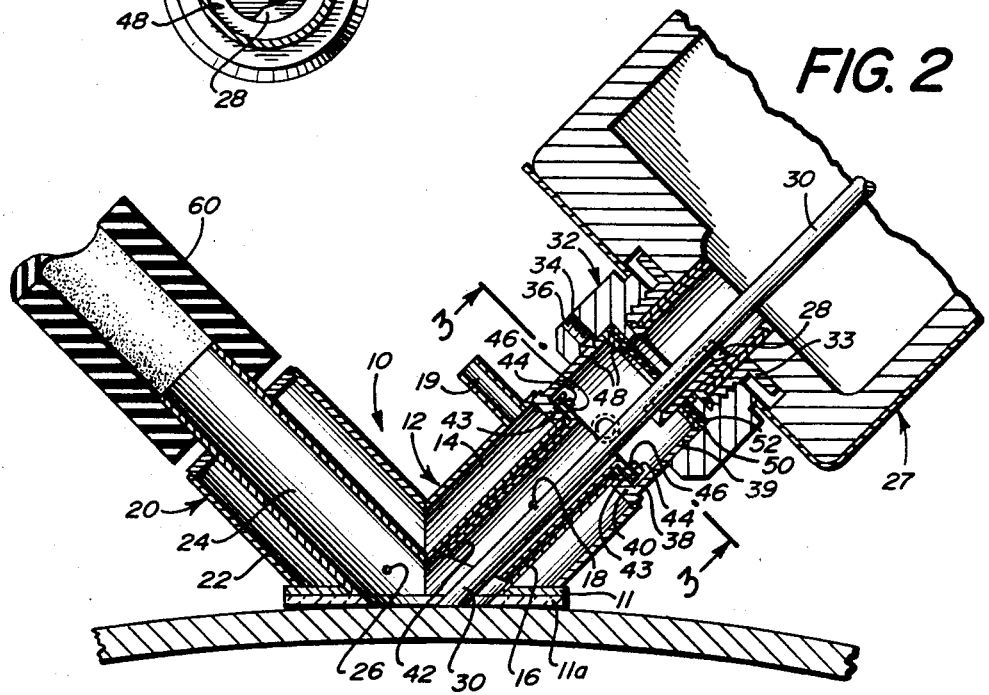
FIG. 2 is a section taken along lines 2—2 of FIG. 1.

Referring to the drawing and particular to FIGS. 1 and 2 the vacuum carbon arc metal removal process according to the present invention can be effected by utilizing a nozzle, chamber, volume determining or isolating device shown generally as 10. The device or nozzle 10 is constructed by first providing a base plate 11 with a suitable aperture which may be circular or elliptical in shape. Bonded to the base plate 11 which is generally fabricated from a conductive material such as copper is an insulating plate 11a. Insulating plate 11a has a corresponding opening identical to that of the base plate 11.

Fixed to base plate 11 is a first concentric tube assembly 12 having an outer tube 14 and an inner tube 16 which is adapted to close a portion of the aperture (not shown) in base plate 11. Fixed to base plate 11 and in fluid tight communication with assembly 12 is a second concentric tubular assembly 20 having an inner tube 24 and an outer tube 22 which close the rest of the aperture in base plate 11. Thus the assembly of the base plate 11 and tubular assemblies 12 and 20 are constructed and arranged so that a fluid such as water admitted through a conduit 19 will enter the space between tubes 14 and 16 and 22 and 24 and complete surround these tubes. A pair of diametrically opposed apertures or holes 18 in tube 16 and six equally spaced holes 26 extending through the wall of tube 24 permit fluid entering through conduit 19 to enter the inner portions of tubes 16 and 24 and contact the electrode shown as 30. The combination of the base plate 11 and tubular assembles 12 and 20 also define a chamber or volume which when an arc is struck between the electrode 30 and the workpiece such as a section of a pipe or tank used for illustrative purposes in FIG. 2 the insulating plate 11a is closely juxtaposed to the workpiece the arc is surrounded and the atmosphere around the arc is isolated from the ambient environment. The space between the workpiece and insulating plate 11a permits air to enter into the area of the electric arc surrounded by the chamber defined by the interior portions of conducts 16 and 24.

Shown in FIG. 2 as 27 is an automatic air carbon-arc cutting and gouging torch such as shown in U.S. Pat. No. 4,527,037. Torch 27 incldues all the necessary apparatus to continuously drive the electrode through the aperture in base plate 11 to maintain a constant arc length between the electrode and the workpiece. Current to the electrode is provided by means of the conventional electrode contact shoe 28 of the torch 27. The torch 27 is modified by providing a lock nut 32 in place of the conical head shown in the device of the '037 patent. Lock nut 32 includes a plurality of equally spaced apertures 34 which are suitably threaded to receive a plurality of set screws 36 so that lock nut 32 can be fixed to a tube extension 38 which in turn is held in fluid tight relation to outer tube 14 of assembly 12 as by a circumferential weld or braze. Disposed within extension tube 38 for projection inside of tube 16 of assembly 12 is a spacer tube 42 containing an internal insulating coating to prevent arcing between the electrode 12 and nozzle 10 should the electrode 30 inadvertently touch the inside of tube 42. Tube 42 includes a pair of apertures which are identical to and aligned with apertures 18 in tube 16. Tubular member 42 terminates in a flange 43 so that it can be rigidly secured to extension tube 38 by means of fasteners such as screws 44 and insulating washer 46 to prevent electrical contact between tubular member 42 and the balance of the nozzle 10. The end of extension 38 held by lock nut 32 contains a pair of washers like devices 48 and 52 which hold a flexible vacuum seal 50 which surrounds electrode 30 to prevent excess atmosphere from being introduced to the nozzle 10 through the torch 27. Tubular assembly 20 is constructed so that tube 24 projects beyond tube 22 and is adapted to receive a vacuum hose 60. The vacuum hose or conduit 60 is in turn connected to a vacuum removal device such as a vacuum cleaner (not shown).

In operation when conduit 60 is connected to a vacuum device and the nozzle 10 is juxtaposed to a workpiece which is to be gouged or cut, the electrode 30 is brought into operating position and an arc struck between the electrode and the workpiece molten metal will be forcibly removed through conduits 24 and 60 to a collection device (not shown). Water introduced into the nozzle 10 through conduit 19 will be forced into the area surrounding the arc and forcibly through the vacuum hose 60 to quench any molten slag and carry any process generated fume away from the arc and the nozzle 10. Thus the nozzle 10 isolates the area completely surrounding the arc to prevent molten metal and fume from reaching the ambient atmosphere and shields the noise of the arc from the user.

Figure 4:
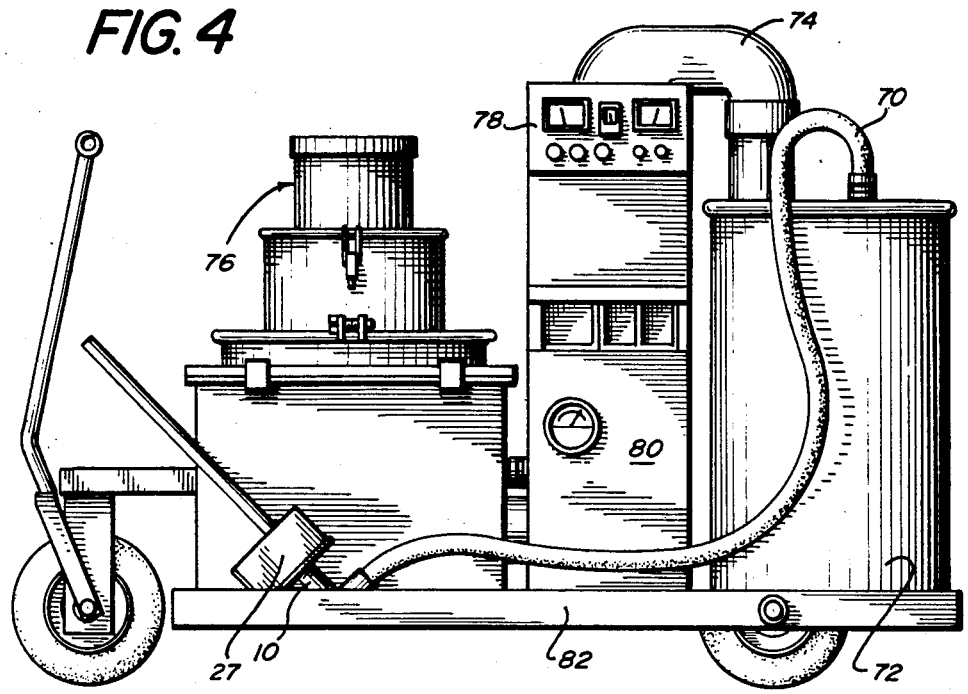
FIG. 4 is a front elevational view of a complete system employing the process of the present invention.
Figure 5:
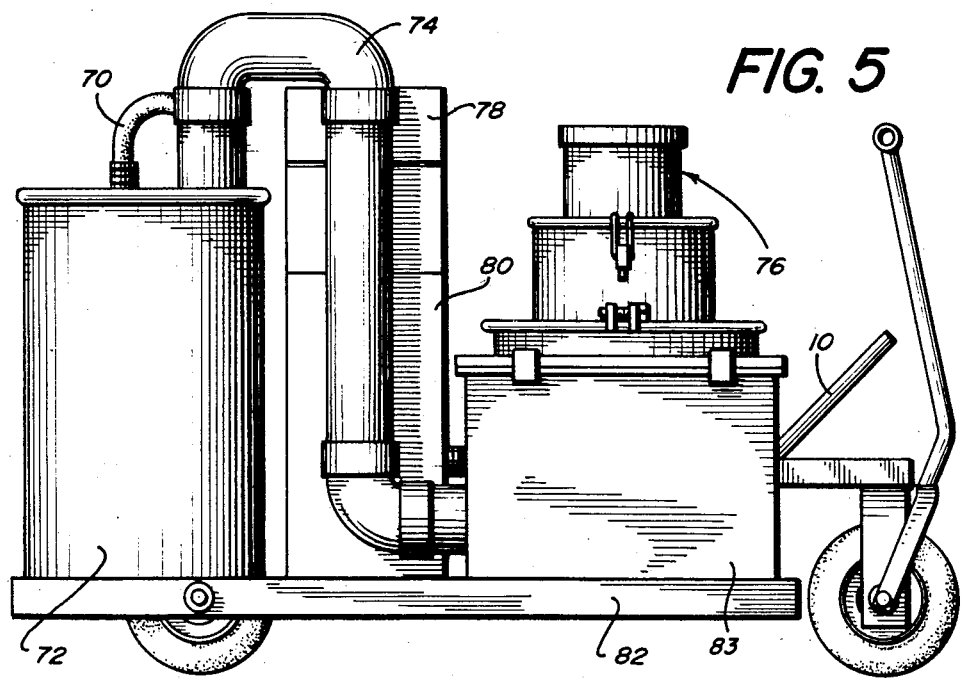
FIG. 5 is a rear elevational view of the complete system of FIG. 4.

Referring to FIGS. 4 and 5 the system includes the nozzle 10 to which is fixed the automatic torch head 27. A small diameter plastic hose 70 is fitted to tube 24 of nozzle 10 and is in turn connected to a collection device 72. In its simplest form collection device 72 can be a conventional 55 gallon drum. Collection device 72 is in turn connected to a vacuum system (76) and filter tank 83 by means of suitable conduits such as pVC pipe 74. To complete the system the conventional controllers for the automatic torch head is shown as 78 and a control panel for the water and vacuum is shown as 80. The entire device can be mounted on a cart 82 for ease of conveyance to a work site. What is not shown is a device for moving the nozzle and torch (10 and 27) along the workpiece in a confined manner. This can be achieved by any of the known devices for guiding a metal working tool along fixed path such as shown in U.S. Pat. No. 4,330,109 the specification of which is also incorporated herein by reference.

Figure 3:
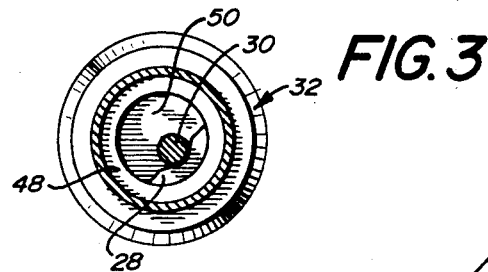
FIG. 3 is a section taken along lines 3—3 of FIG. 2.

A particularly effective vacuum system shown as the assembly 76 of FIGS. 4 and 5 can be obtained from the Doyle Vacuum Cleaner Company of Grand Rapids, Mich. The model 78a supplied by this manufacturer with an 80 inch water lift capacity has been used to accomplish effective cutting and gouging with the nozzle 10 shown in FIGS. 1–3.

The vacuum system 76 can include a cloth filter to capture secondary fume which cloth filter can be part of the assembly 76. Filter tank 83 acts as the primary fume collection chamber. Collection device 72 collects solid particles. Because the system utilizes water ordinary plastic tubing can be used between the nozzle 10 and the collection device 72 since any molten material is cooled rapidly.

A preferred set of operating parameters is a vacuum of 20 inches of water (gauge) with a minimum flow of water entering the conduit 19 of 0.4 gallons per minute. Tests have shown that if the vacuum is measured at the point where vacuum hose 60 is connected to tube 24 the vacuum must be at least 20 inches of water. If the vacuum is measured in extension tube 38 the system will perform satisfactorily with a vacuum of 4 inches of water. This latter location, away from the slag and fume collection remains clear at all times and provides a location for a sensor to control the process. A sensor mounted in this location is connected to the control system which in turn will turn off the arc if the vacuum falls below 4 inches of water. The system can be provided with a flow switch such as flotect model V-6 flow switch supplied by W. E. Anderson Company of Kansas City, Mo. in the conduit 19. The flow switch (not shown) is set to operate between 0.6 gallons per minute maximum and 0.4 gallons per minute minimum. A pressure switch placed above the water inlet to sense the pressure inside of the nozzle 10 is set to turn off the system if the pressure falls below 4 inches of water gauge. Such a device is offered for sale by Dwyer Instruments Inc. of Michigan City, Ind. as a photohelic ( Switch). The placement of the pressure sensor at this location provides faster reaction time in shutting off the vacuum if there is plugging at the opening of the nozzle at insulating plate 11. The flow switch and pressure switch are utilized in control panel 80 in conjunction with the conventional controls in a manner to provide complete system shutdown if certain parameters are not maintained.

For the present invention a vacuum, measured at the vacuum tube 60 - extension tube 24 interface, of 20 inches of water (gauge) is preferred however the apparatus of the invention has been operated with 12 inches of water (gauge).

A device according to the present invention was tested in comparison to a conventional air carbon-arc cutting and gouging torch and the results summarized in Table 1 below.

TABLE 1

| Gouge No. | Arc Time (Min.) | Pounds/ Min. | Metal Removed Pounds/ Electrode | Length of Electrode (in) | Noise Level (DbA) |
|---|---|---|---|---|---|
| V 1 | 0.490 | 0.918 | 6.12 | 1.249 | 98.5 |
| V 2 | 0.475 | 0.674 | 4.39 | 1.237 | 98.5 |
| V 3 | 0.500 | 1.020 | 6.70 | 1.293 | 98.5 |
| V 4 | 0.4900 | 0.816 | 5.60 | 1.213 | 97.0 |
| V 5 | 0.4167 | 0.840 | 5.86 | 1.014 | 97.5 |
| V 6 | 0.4517 | 0.930 | 6.17 | 1.156 | 97.5 |
| V 7 | 0.4517 | 0.886 | 5.96 | 1.140 | 97.5 |
| V 8 | 0.4067 | 0.934 | 6.46 | 1.000 | 96.5 |
| V 9 | 0.4700 | 0.915 | 6.23 | 1.172 | 98.0 |
| V 10 | 0.5450 | 0.899 | 5.96 | 1.396 | 97.5 |
| Average | 0.4697 | 0.883 | 5.95 | 1.187 | 97.7 |
| S 1 | 0.5450 | 1.339 | 8.09 | 1.534 | 123 |
| S 2 | 0.5450 | 1.413 | 8.89 | 1.472 | 121.5 |
| S 3 | 0.5317 | 1.392 | 8.54 | 1.473 | 122.0 |
| S 4 | 0.5683 | 1.408 | 8.71 | 1.560 | 121.0 |
| S 5 | 0.5783 | 1.366 | 8.33 | 1.612 | 122.0 |
| S 6 | 0.5783 | 1.383 | 8.16 | 1.665 | 122.0 |
| S 7 | 0.4567 | 1.380 | 8.92 | 1.200 | 122.0 |
| S 8 | 0.4633 | 1.403 | 9.23 | 1.197 | 122.0 |
| S 9 | 0.5167 | 1.452 | 9.10 | 1.400 | 121.0 |
| S 10 | 0.5127 | 1.380 | 8.47 | 1.445 | 122.0 |
| Average | 0.5305 | 1.392 | 8.64 | 1.456 | 121.9 |

Note:
(1) Electrode for each test STDAAC ⅜" diameter copper coated graphite
(2) Tests V-V10 and S1-S10 current: 850 amps
(3) Tests V1-V10 Vacuum 42 inches of H₂O
(4) Tests S1-S10 Air Pressure 60 psi
(5) Tests V1-V10 Average Gouge Measurements 0.835 inches wide × 0.310 inches deep
(6) Tests S1-S10 Average Gouge Measurements 0.715 inches wide × 0.442 inches deep From the foregoing Table it is apparent that the device of the present invention which is embodied in tests V-1 through V-10 provides a significant reduction in the noise level (average 97.7 DbA) over the noise level of the conventional air carbon-arc apparatus summarized in tests S-1 through S-10 whose average operating noise level was 121.9 DbA. The noise reduction effected with the device of the present invention is significant and within the guide lines for safe operation of a process wherein workers in the area do not require further ear protection.

Furthermore, those who are familiar with the air carbon-arc cutting and gouging process will appreciate the process and the apparatus of the present invention prevent process generated fume and slag from entering the ambient atmosphere and such materials can be safely collected and disposed of, thus making a safer working environment.

Thus the vacuum arc cutting and gouging process of the present invention is cleaner and quieter than the conventional air carbon-arc cutting and gouging process.

The present invention discloses for the first time the use of vacuum alone to remove metal melted by an electric arc the vacuum also being used to transport the removed metal and associated fume through a closed collection system for storage in a container until it is to be discarded. With the device of the present invention low melting point materials can be used successfully for major portions of the system thus permitting an easily fabricated device.

While a particular nozzle has been shown and described other devices are within the scope of the present invention so long as they provide a means of isolating the area surrounding the electric arc to prevent process generated slag and fume from entering the ambient environment while reducing the overall noise level of the process.

Having thus described our invention what is desired to be secured by Letters Patent of the United States is set forth in the appended claims.

What we claim is:

1. A method for cutting or gouging a metallic workpiece comprising the steps of:
    (a) providing an electrode and means for striking and maintaining an arc between said electrode and said workpiece;
    (b) isolating a portion of the electrode and the related arc struck between the electrode and said workpiece and the atmosphere surrounding said arc and said workpiece;
    (c) injecting water into said isolated atmosphere surrounding said arc and
    (d) subjecting said isolated portion to the effect of a vaccuum to continuously evacuate said atmosphere surrounding said arc and said workpiece, said atmosphere containing molten metal and air drawn from outside said isolated portion while moving said electrode in a direction to produce the desired cut or gouge in said workpiece.

2. A method according to claim 1 wherein said electrode is a conventional air carbon-arc cutting and gouging electrode.

3. A system for vacuum arc cutting or gouging comprising in combination:
    a vacuum arc cutting and gouging head adapted to position a cutting and gouging electrode and an evacuation conduit at an angle to a workpiece and to each other said head constructed and arranged so it can isolate a portion of the atmosphere surrounding a portion of said electrode and all of an arc resulting from completing an electrical circuit between said electrode and said workpiece said head being enclosed by a water jacket and adapted to admit water to the atmosphere surrounding said arc and a portion of said electrode, said system further including means to continuously admit water to said water jacket;

means to continuously feed said electrode toward said workpiece;

means to continuously remove molten metal by evacuation from said cutting and gouging head and means to continuously move said head along said workpiece to perform an elongated cut or gouge on said workpiece.

4. A system according to claim 3 including means to collect and filter the atmosphere evacuated from said cutting and gouging head.

5. An apparatus for cutting or gouging a metallic workpiece comprising in combination:

a generally flat base plate adapted to be moved along said workpiece said base plate having an aperture adapted to permit an arc to be struck and maintained between an electrode positioned proximate said aperture and said workpiece;

a first generally elongated conduit fixed to said base plate and having a first end partially covering said opening in said base plate and a second end adapted to receive means to feed an electrode toward said workpiece;

a second generally elongated conduit fixed to said base plate and having a first end covering the remaining portion of said opening in said base plate and a second end adapted to receive means to evacuate said second conduit;

said first and second conduits and said base plate so constructed and arranged so that when in use the combination defines a chamber or volume surrounding a portion of said electrode and the resulting arc whereby said means to evacuate said second conduit can continuously evacuate said chamber.

6. An apparatus according to claim 5 wherein said first and second conduits are surrounded by fluid tight jackets which contain suitable apertures to admit fluid to the chamber or volume so defined when the apparatus is in use.

7. An apparatus according to claim 5 wherein said means to feed said electrode includes an auotmatic carbon-arc cutting and gouging torch.

8. An apparatus according to claim 5 wherein said means to evacuate said second chamber includes a vacuum cleaner.

* * * * *